Nov. 28, 1950 — T. E. PHARES — 2,531,462

RACK FOR TOASTING BREAD

Filed Dec. 10, 1948

Inventor,
Thomas Esta Phares
By Schneider & Dressler
Attys.

Patented Nov. 28, 1950

2,531,462

UNITED STATES PATENT OFFICE 2,531,462

RACK FOR TOASTING BREAD

Thomas Esta Phares, Shelbyville, Ind., assignor to Chambers Corporation, a corporation of Indiana Application December 10, 1948, Serial No. 64,578

5 Claims. (Cl. 99—385)

This invention relates to a rack for toasting bread, and particularly to a toasting rack that may be used either over a top gas burner or inside a heating unit built into a gas cooking range.

One of the chief disadvantages heretofore encountered in toasting bread over a gas burner has been the difficulty of distributing the heat uniformly so that both sides of each slice are browned evenly. A disadvantage in toasting bread in an oven is due to the necessity of turning the slices over after one side is browned. The use of an oven also wastes a considerable amount of gas, particularly if only a few slices of bread are toasted, and heats up the kitchen. In hot weather the heating of the kitchen may be very disagreeable.

The present invention, in its preferred aspect, contemplates the utilization for toasting bread of a heating unit that may be built into a gas range, as described in the copending application Serial No. 55,094, filed October 18, 1948, by John E. Chambers and myself as joint inventors. This heating unit comprises a substantially closed well, built into the gas range and completely insulated to retain hot air for prolonged periods of time. The air, which is substantially sealed in the unit, is heated by means of a single gas burner positioned under a grate near the bottom of the unit. The size of the heating unit and the character of its insulation prevent undue heating up of the kitchen.

The toasting rack is particularly designed to hold a plurality of slices of bread with both sides of each slice exposed in an area of uniformly heated air. The base of the rack acts as a baffle plate to aid in the uniform distribution of the heat from the gas burner. The rack is of simple, inexpensive construction and may be readily removed from the heating unit so as not to interfere with its regular uses. Although the rack is particularly intended for use in a heating unit as described above, it may be used over a top gas burner or any other source of heat.

Figure 1:
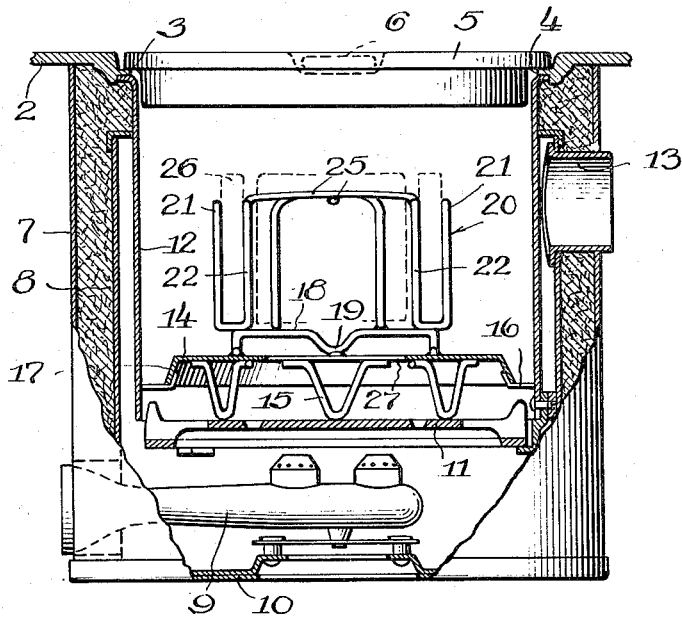
Figure 2:
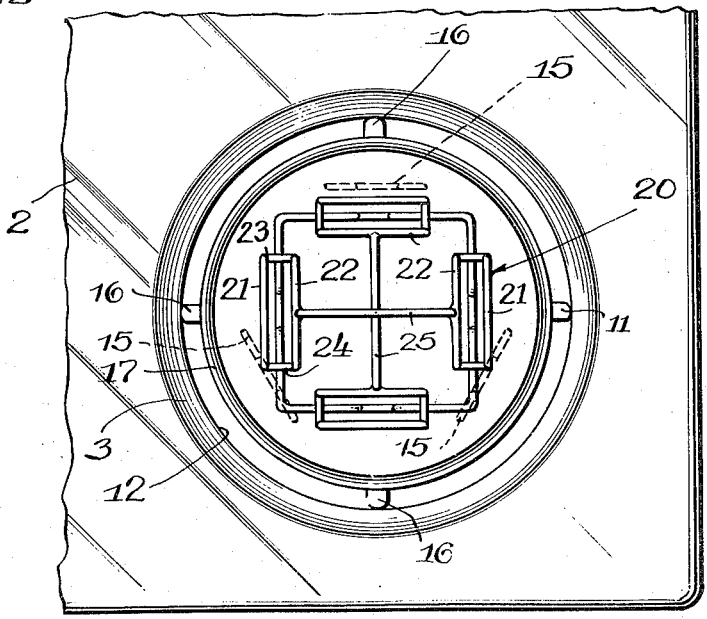

The structure by which the above advantages are attained will be described in the following specification, taken in conjunction with the accompanying drawing, in which:

Figure 1 is a side elevation of a heating unit with the side wall broken away, showing the toasting rack positioned on the grate of the heating unit; and Fig. 2 is a top elevation looking down into the heating unit with the top cover removed.

In the drawings, the reference numeral 2 indicates the top of a gas range in which the heating unit is housed. A flange 3 surrounds the opening 4 which constitutes the open top of the heating unit. A cover 5, filled with suitable insulating material, is seated on flange 3 to close the top of the heating unit. The top of cover 5 is flush with the top of the stove and is provided with a handle 6 positioned in a recessed portion of the cover. The side walls of the heating unit comprise a pair of spaced concentric cylindrical hulls 7 and 8 the space between which is filled with insulating material.

A gas burner 9 is positioned above the bottom wall 10, and a grate 11 is suspended directly above the burner by means of an inner concentric hull 12. The inner hull is suspended from top 2 and is imperforate to form a large dead air space within which the heated air is confined. A pair of horizontally off-set flue vents 13 (only one being shown) extends through hulls 7 and 8 to provide avenues for constant escape of the hot air and burned gases from burner 9 while the burner is lighted.

The toasting rack includes a base 14 of metal or other suitable non-combustible material supported on a plurality of feet 15 which rest on grate 11. The feet may be formed in any suitable manner, but are shown as inverted triangular wire loops having their ends welded to the underside of base 14. The base is slightly smaller than the diameter of inner hull 12 to permit easy insertion, and is provided with a plurality of laterally extending lugs 16 which locate the rack centrally of the hull. Each lug is welded to the inside of a downwardly extending circumferential flange 17 integral with base 14.

The slices of bread to be toasted are individually supported by a wire frame secured to base 14. The frame comprises a horizontal rail 18, preferably in the form of a wire bent square with an intermediate portion of each leg of the square bent into the form of a V with the bottom of the V welded to the base, as indicated at 19. The rail may be formed of a strip of metal having separate feet supporting it in spaced relationship to said base.

Each leg of rail 18 has a vertically extending wire trough 20 secured thereto for receiving a slice of bread to be toasted. The troughs are duplicates of each other, so only one will be described.

Each trough 20 comprises a wire bent into two inverted U-shaped members 21 and 22 joined together in spaced parallel relationship, preferably at the bottom by transverse portions 23 and 24. The transverse wires are welded to horizontal rail wire 18 and the tops of each U-shaped member 22 are tied together by horizontal cross wires 25 each of which has its ends welded to oppositely disposed members 22 to provide a handle for inserting and removing the structure and to give the wire frame additional stability.

Each slice of bread 26 is supported on transverse wires 23 and 24, and is retained in vertical position by members 21 and 22.

The center of base 14 is provided with a square opening 27, slightly smaller than wire square 18 so that air heated by burner 9 passes through the center to toast the inner sides of the slices of bread at the same time that it passes between the outside of flange 17 and hull 12. As the hot air passes upwardly into the dead air space defined by hull 12 and top cover 5, it is virtually sealed there and the bread is uniformly toasted in the hot air, even after the burner has been extinguished.

The spacing of the transverse wires 23 and 24 above the base keeps the bread being toasted out of direct contact with the base so that the bottom of the slice will not get scorched. Due to the provision of grate 11 intermediate the burner and base 14 of the toasting rack, scorching of the bread by direct application of the flame from the burner is prevented. The flame from the burner strikes and heats the grate and the grate in turn heats the air which rises upwardly over the exposed faces of the bread to toast the same.

The air within hull 12 is substantially uniformly heated and, therefore, the bread is enveloped in a blanket of uniformly heated air which insures substantially uniform toasting thereof.

Although a preferred embodiment of the invention has been described in detail, the description is intended to be illustrative, rather than restrictive, as many details may be modified or changed without departing from the spirit or scope of the invention. Thus, for example, the number of troughs for the bread may be varied as desired and the shape of opening 27 in base 14 made to conform to this number. For example, with three troughs the opening would be made with a triangular shape and with six troughs, with a hexagonal shape. Accordingly, I do not desire to be restricted to the exact structure described.

I claim:

1. A rack for toasting bread comprising a centrally apertured base, a wire mounted on said base with a major portion thereof in a horizontal plane spaced above said base portion, said wire extending around said aperture and positioned intermediate the inner edge of said base, which defines said aperture, and the outer edge of said base, and a plurality of individual wire troughs secured to said horizontal wire in upstanding position, said troughs being spaced apart a sufficient distance to permit each of them to support a slice of bread.

2. A rack for toasting bread comprising a base, an opening in said base, a horizontal rail mounted in spaced relationship above said base and about said opening, said rail being positioned between said opening and the outer edge of said base, and a plurality of troughs mounted on said horizontal rail, each of said troughs comprising a wire bent to form a pair of parallel inverted U-shaped members positioned vertically relative to said base, each of said U-shaped members being connected to the other at its lower edges by transverse portions permanently secured to said rail.

3. A rack for toasting bread comprising a metal base, a wire bent into the shape of a square, portions of said wire being bent into V-shape with the bottom of each V welded to said base to support the portions of said wire between said V-shaped portions in a horizontal plane above said base, and a wire trough secured to each leg of said square, each of said troughs comprising a wire bent to form a pair of parallel inverted U-shaped members spaced apart to receive a slice of bread therebetween, the corresponding ends of said U-shaped members being joined by a transversely extending portion of said last mentioned wire welded to said horizontal wire to support said troughs in vertical position relative to said base.

4. A rack for toasting bread comprising a metal base, a wire bent into the shape of a square, portions of said wire being bent into V-shape with the bottom of each V welded to said base to support the portions of said wire between said V-shaped portions in a horizontal plane above said base, an opening in said base disposed centrally of said wire square with the edges of said opening being laterally spaced from said wire square, and a wire trough secured to each leg of said square, each of said troughs comprising a wire bent to form a pair of parallel inverted U-shaped members spaced apart to receive a slice of bread therebetween, the corresponding ends of said U-shaped members being joined by a transversely extending portion of said last mentioned wire welded to said horizontal wire to support said troughs in vertical position relative to said base.

5. A rack for toasting bread comprising a base, a horizontally disposed wire, said wire having portions bent to form integral legs depending therefrom, each of said legs being welded at its bottom to said base, and a plurality of wire troughs, each of said troughs comprising a wire bent to form a pair of parallel inverted U-shaped members spaced apart to receive a slice of bread therebetween, the corresponding ends of said U-shaped members being joined by a transversely extending portion of said last mentioned wire welded to said horizontally disposed wire to support said troughs in vertical position relative to said base.

THOMAS ESTA PHARES.

REFERENCES CITED

The following references are of record in the file of this patent:

UNITED STATES PATENTS

| Number | Name | Date |
|---|---|---|
| 1,624,182 | Rebora | Apr. 12, 1927 |
| 1,948,978 | Bendix et al. | Feb. 27, 1934 |